United States Patent [19]

Philibert

[11] 4,174,030
[45] Nov. 13, 1979

[54] VIBRATORY CLEANER FOR ENDLESS BELT CONVEYOR

[76] Inventor: Daniel Philibert, 152 rue Francois Frandaz, 38290 La Verpilliere, France

[21] Appl. No.: 891,387

[22] Filed: Mar. 29, 1978

[30] Foreign Application Priority Data

Apr. 26, 1977 [FR] France ............................ 77 13613

[51] Int. Cl.² ............................................. B65G 45/60
[52] U.S. Cl. .................................. 198/494; 198/533
[58] Field of Search ............ 198/494, 787, 835, 446, 198/533; 74/230

[56] References Cited

U.S. PATENT DOCUMENTS

| | | | |
|---|---|---|---|
| 3,150,768 | 9/1964 | Muller | 198/835 X |
| 3,220,540 | 11/1965 | Frontczak | 18/494 |
| 4,042,102 | 8/1977 | Wadensten | 198/494 |

FOREIGN PATENT DOCUMENTS 1397714  6/1975  United Kingdom ............... 198/494

Primary Examiner—Robert B. Reeves
Assistant Examiner—Douglas D. Watts
Attorney, Agent, or Firm—Browdy and Neimark

[57] ABSTRACT

A device for clearing residues of pulverulent or particulate product from a belt conveyor includes a vibrating roller freely rotatably mounted between an upper carrier run and a lower return run of said conveyor belt and biased into engagement with the inner side of the return run, the vibrating roller being sealed against ingress of dust and other foreign matter and enclosing a vibration generator motor. In such a device the vibration generator motor is protected from the effects of dust and climatic variations and is of compact form. The vibrating roller is resiliently supported by coil springs which thrust the roller against the inside face of the return run of the conveyor belt to ensure that contact is maintained between the vibrating roller and the return run of the conveyor belt even when the conveyor belt is circulating at a high linear speed.

7 Claims, 2 Drawing Figures

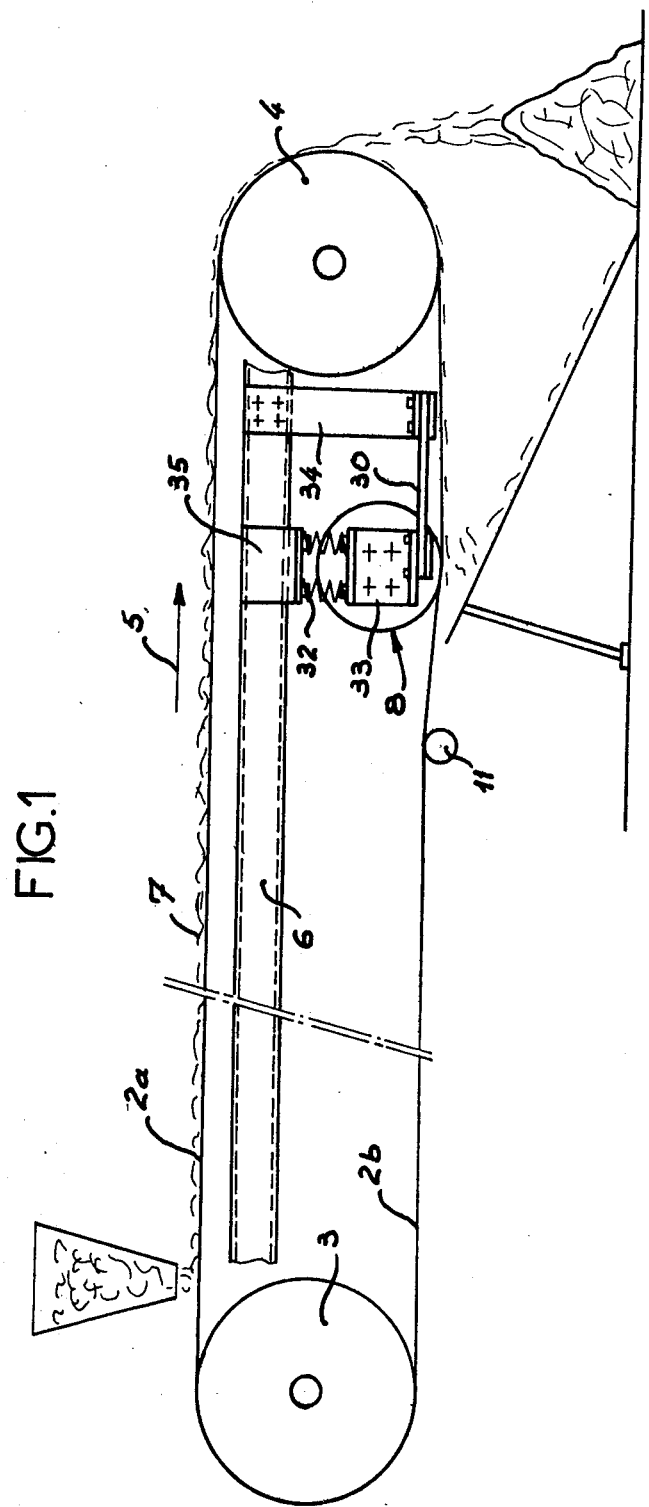

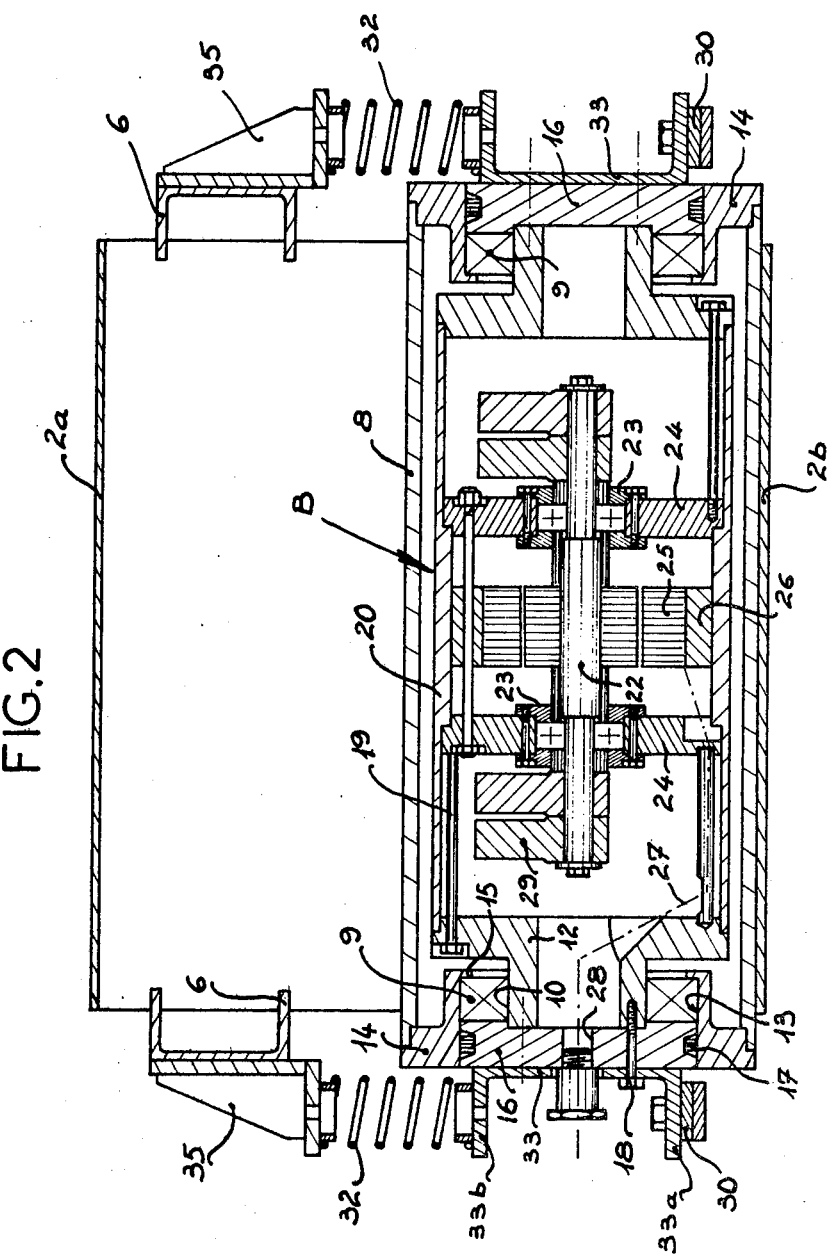

VIBRATORY CLEANER FOR ENDLESS BELT CONVEYOR

The present invention relates to an endless belt conveyor and in particular to cleaning residues of pulverulent or particulate products from the conveyor belt or belts in use of such an endless belt conveyor.

To avoid clogging of the conveyor belt by particulate or pulverulent products, it is well known to provide, on the return run of the belt, a vibrating device intended to clear from this belt run residues of the product adhering to it and which residues would, in the absence of this cleaning device, fall under the conveyor.

Such a cleaning device may comprise a vibrating, freely rotating roller connected to the vibration generating devices and in contact with the inside of the return run of the conveyor belt between one of the return rollers and a supporting roller.

In present day devices of this type, the vibration generating devices or their driving motors are arranged either laterally of the belt or between the two runs of the latter. In these two cases, these vibration generating devices are not sufficiently protected against the weather and against dust and this leads to their premature wear.

The object of the present invention is to provide a belt cleaning device which should be reliable, of small dimensions, and perfectly protected against the weather and dust, and which can even be used on conveyors working at high linear speeds.

According to the present invention we provide an endless belt conveyor comprising at least one conveyor belt passing around guide rollers; and a vibrating, freely rotating roller in contact with the inside face of the return run of the or a conveyor belt between one of the guide rollers and a supporting roller, the vibrating roller being freely rotatably mounted on stationary bearers which are resiliently connected to the frame of the conveyor and constitutes a sealed housing for a vibration generator motor whose stator is connected to the above mentioned bearings.

Due to this design, the vibration generating devices are perfectly protected and do not lead to increasing of the size of the belt conveyor. Because of this, the dimensions of the cleaing device are equal to that of the vibrating roller which allows it to be housed entirely between the two runs of the conveyor belt.

Preferably, each bearing for the vibrating roller is, fixed to an external plate which is held by upper compression coil springs, which are also supported by the conveyor frame, against the free end of a lower leaf spring whose other end is connected to a component of the frame.

This arrangement allows the vibrating roller to be kept in contact with the return run of the belt even while the belt is being displaced at a high linear speed.

In order that the invention may more readily be understood the following description is given, merely by way of example, reference being made to the accompanying schematic drawings which show one embodiment of the clearance device according to the invention. In the drawings:

FIG. 1 is a side elevational view; and

FIG. 2 is a sectional view, on an enlarged scale taken on line 2—2 of FIG. 1.

As shown in FIG. 1, a conveyor belt passes over two horizontally spaced guide rollers 3 and 4 to define a carrier run 2a and the lower return run 2b. Roller 4 is the drive roller and provides the belt with a displacing motion in the direction of arrow 5 of FIG. 1. Various further rollers, not shown, support belt runs 2a and 2b between the above mentioned rollers 3 and 4. These various rollers are carried by a generally designated frame 6.

When a product 7 in either particulate or pulverulent form is deposited on the carrier run 2a, the belt conveys it over its whole length up to the return roller 4, where it is discharged.

The clearance device according to the invention is constituted by a roller 8 which is connected to vibration generating devices and is arranged between runs 2a and 2b of the conveyor belt between the return roller 4 and an idler roller 11 arranged under run 2b, and so as to come into contact with the inner side of run 2b.

As shown more particularly in FIG. 2, the roller 8 is mounted to rotate freely on bearers supported by the frame 6 and constitutes a housing for a vibration generator motor generally designated B.

In this embodiment, each one of the bearers for the roller 8 comprises at least one bearing 9, whose inner race is fitted on a cylindrical journal pin 10 arranged at an end 12 of the casing 20 of the vibration generator motor B. The outer race of this bearing 9 is connected to rotate with the roller 8 and more particularly, is fitted in the internal bore 13 of a rotating collar 14 fitted in the corresponding end of the said roller 8. Bearing 9 is secured against axially inward travel by the abutting of its cage against a shoulder 15 of the rotating collar 14, and against axially outward travel by abutting against a stationary end cover 16 within the rotating collar 14. This end cover 16 comprises sealing devices and in particular, a groove for a seal ring 17 which protects bearing 9 and also the whole of the vibration generator motor B against both dust and weather. Thanks to this arrangement, the vibrator generator motor B is perfectly protected within the roller 8. It should be noted that each one of the ends 12 of the casing 20 of the vibration generator motor B is connected by screws 18 to a respective stationary end cover 16, thus holding the casing 20 of motor B against rotation as the vibration generator rotor of the motor B rotates, in use.

In the known way, the vibration generator motor comprises a shaft 22 mounted to rotate freely in bearing 23 carried by the intermediate side plates 24. In its central portion, the shaft 22 is fixed to an armature 25 adjacent an inductor 26 supplied with electric current by cable 27. This cable 27 leads to the outside by passing through an opening 28 arranged in one of the end covers 16. Each of the end covers 16 is connected to the intermediate side plates 24 aligned by tie rods 19 thanks to which, it assists in the support of casing 20 of the motor B. At each of its free ends, the shaft 22 is fitted with several eccentric unbalancing masses 29 which, during rotation of the motor B, generate a vibratory motion.

Each end cover 16 is connected to the frame by the interposition of resilient supports which, in this embodiment, are constituted by a lower leaf spring 30 and by the vertical compression coil springs 32 at the top. For this purpose, each end cover 16 is fixed to the web of a carrier 33 which is of U-shaped cross-section and whose lower horizontal flange 33a is connected to one of the ends of the leaf spring 30. By its other end, this leaf spring 30 is connected, as shown in FIG. 1, to a column 34 fixed to the frame 6. The lower ends of the compression coil springs 32 bear on the horizontal top flange 33b of carrier 33, while their top ends bear against a bracket 35 which is also connected to the frame 6.

In this arrangement, the whole of the device is free to move vertically, but it is nevertheless forcibly applied against the lower run 2b of the conveyor belt, allowing it to function effectively even when this run is displaced at high linear speeds.

The idler roller 11 limits, on the one hand, the length of the run 2b which is subjected to the stress of impact of the vibrating roller 8, and this allows the required strong localised pressure and, on the other hand, confines the vibrations by preventing their transmission beyond the belt cleaning zone in the lower belt run between the drive roller 4 and idler roller 8. In this zone, any residue of the product, still clinging to the belt, is shaken free by the vibrating of roller 30 and falls onto a chute taking it down into the discharge stack.

It follows from the preceding considerations that the device in accordance with the invention forms an assembly which is not bulky which can operate so as to clean the belt reliably irrespective of the speed of displacement of the belt, and can do so even in a very dusty environment.

This belt cleaning device may be used on any belt conveyor to clear the residue of particulate or pulverulent products which adhere to the conveyor belt.

I claim:

1. An endless belt conveyor comprising frame means, conveyor belt means, first and second guide roller means carried by said frame means and supporting said conveyor belt means to have an upper carrier run and a lower return run thereof, vibrating freely rotating roller means in contact with the inside face of said conveyor belt means on said return run thereof, supporting roller means engaging said return run of said conveyor belt means and located such that said vibrating roller means is disposed between said supporting roller means and said first guide roller means, first and second bearer means supporting said vibrating roller means at respective ends thereof, means resiliently connecting said first and second bearer means to said frame means, vibration generator motor means disposed within said vibrating roller means and having a stator connected to said first and second bearer means, and means sealing said vibrating roller means against access of dirt to said vibration generator motor means, wherein said first and second bearer means each comprise a bearing having an inner race and an outer race, wherein said stator means of said vibration generator motor means includes first and second cylindrical journal pins engaged in the respective bearings of said first and second bearer means, and wherein said first and second bearer means each further include (a) respective end cover means and means for connecting said end cover means to the respective one of said first and second journal pins and (b) respective abutment means carried by said vibrating roller means for preventing axially inward movement of said bearing with respect to said vibrating roller means by engaging the outer race of said bearing.

2. A belt conveyor according to claim 1, and including first and second collar means mounted at the ends of said vibrating roller means each said collar means including means defining a bore receiving the respective one of said first and second journal pins, said first and second collar means further comprising radially inner flange means serving as said abutment means, said outer race of each said bearing being fitted within said bore of the respective collar means and in engagement with said radially inner flange means.

3. A belt conveyor as set forth in claim 1 or claim 2, wherein said sealing means is located between said vibrating roller means and the respective end cover means of said first and second bearer means.

4. A belt conveyor as set forth in claim 3, wherein said end cover means each include a radially outwardly facing part, and wherein said sealing means is carried by said outwardly facing part.

5. A belt conveyor according to claim 1 or claim 2, wherein said bearer means further comprise: an external carrier rotatably supporting said vibrating roller means, and having upper and lower flanges; compression coil spring means engaging said upper flange of said external carrier; means connecting said compression coil spring means to said frame means; and leaf-spring means connected to said frame means and engaging said lower flange of said external carrier, whereby said compression coil spring means thrust said carrier downwardly to maintain said vibrating roller means in contact with said return run of said conveyor belt means.

6. An endless belt conveyor comprising frame means, conveyor belt means, first and second guide roller means carried by said frame means and supporting said conveyor belt means to have an upper carrier run and a lower return run thereof, vibrating freely rotating roller means in contact with the inside face of said conveyor belt means on said return run thereof, supporting roller means engaging said return run of said conveyor belt means and located such that said vibrating roller means is disposed between said supporting roller means and said first guide roller means, first and second bearer means supporting said vibrating roller means at respective ends thereof, means resiliently connecting said first and second bearer means to said frame means, vibration generator motor means disposed within said vibrating roller means and having a stator connected to said first and second bearer means, and means sealing said vibrating roller means against access of dirt to said vibration generator motor means, wherein said bearer means further comprise: an external carrier rotatably supporting said vibrating roller means, and having upper and lower flanges; compression coil spring means engaging said upper flange of said external carrier; means connecting said compression coil spring means to said frame means; and leaf-spring means connected to said frame means and engaging said lower flange of said external carrier, whereby said compression coil spring means thrust said carrier downwardly to maintain said vibrating roller means in contact with said return run of said conveyor belt means.

7. An endless belt conveyor comprising a conveyor frame; conveyor belt means to carry a product; first and second guide roller means carried by said conveyor frame to support said conveyor belt means so that said conveyor belt means has an upper carrier run and a lower return run; and vibratory cleaner means for said conveyor belt means comprising a freely rotatable roller in contact with the inside face of said conveyor belt means on the return run thereof, first and second bearer means supporting said freely rotatable roller at respective ends thereof, means to bias said freely rotatable roller against the inside face of said conveyor belt means on the return run thereof which means resiliently connects said first and second bearer means to said conveyor frame, vibration generator motor means disposed within said freely rotatable roller and including a stationary casing mounted to said first and second bearer means and also including means to rotate and generate vibrations within said stationary casing, and means to seal the interior of said freely rotatable roller against access of dirt to said vibration generator motor means.

* * * * *